US010344799B2

(12) United States Patent
Sekine et al.

(10) Patent No.: US 10,344,799 B2
(45) Date of Patent: Jul. 9, 2019

(54) SLIDING BEARING

(71) Applicant: OILES CORPORATION, Tokyo (JP)

(72) Inventors: Toshihiko Sekine, Fujisawa (JP);
Kouichi Morishige, Fujisawa (JP);
Keisuke Imagawa, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/567,461

(22) PCT Filed: Apr. 11, 2016

(86) PCT No.: PCT/JP2016/061716
§ 371 (c)(1),
(2) Date: Oct. 18, 2017

(87) PCT Pub. No.: WO2016/175018
PCT Pub. Date: Nov. 3, 2016

(65) Prior Publication Data
US 2018/0106292 A1 Apr. 19, 2018

(30) Foreign Application Priority Data

Apr. 28, 2015 (JP) .................................. 2015-092423

(51) Int. Cl.
*F16C 17/10* (2006.01)
*F16C 33/20* (2006.01)
(Continued)

(52) U.S. Cl.
CPC .............. *F16C 17/08* (2013.01); *F16C 17/10* (2013.01); *F16C 17/18* (2013.01); *F16C 33/102* (2013.01);
(Continued)

(58) Field of Classification Search
CPC .. F16C 17/10; F16C 2240/40; F16C 11/0642; F16C 17/08; F16C 17/18; F16C 2326/05;
(Continued)

(56) References Cited

U.S. PATENT DOCUMENTS 2,872,256 A * 2/1959 Thomson ................. F16C 33/20
384/420
5,052,824 A * 10/1991 Van Wyk ............ F16C 11/0614
384/192
(Continued)

FOREIGN PATENT DOCUMENTS

| CN | 1620560 | 5/2005 |
| CN | 101438069 | 5/2009 |

(Continued)

OTHER PUBLICATIONS

Machine Translation of JP H10-122233 (Year: 1998).*
(Continued)

*Primary Examiner* — Alan B Waits
(74) *Attorney, Agent, or Firm* — Nixon & Vanderhye P.C.

(57) ABSTRACT

Provided is a sliding bearing wherein radial play is prevented. A sliding bearing (1) comprises: an upper case (2) mounted to an upper support for mounting the strut assembly of a strut-type suspension to a vehicle body; a lower case (3) which is mounted to an upper spring seat for supporting the upper end of the coil spring of the strut-type suspension, is combined with the upper case (2) so that the upper case (2) and the lower case (3) can pivot relative to each other, and forms an annular space (5) between the upper case (2) and the lower case (3); and an annular center plate (4) disposed in the annular space (5) and enabling the upper case (2) and the lower case (3) to pivot relative to each other. The center plate (4) has a circular conical surface-shaped bearing surface (41). The upper case (2) has a circular conical
(Continued)

surface-shaped load transmission surface (27) sliding on the bearing surface (42) of the center plate (4).

2 Claims, 6 Drawing Sheets

(51) Int. Cl.
  *F16C 17/18* (2006.01)
  *F16C 17/08* (2006.01)
  *F16C 33/10* (2006.01)
(52) U.S. Cl.
  CPC .......... *F16C 33/20* (2013.01); *F16C 2208/60* (2013.01); *F16C 2208/66* (2013.01); *F16C 2326/05* (2013.01)
(58) Field of Classification Search
  CPC .. F16C 2208/60; F16C 2208/66; F16C 33/20; F16C 33/102; B60G 2204/416
  See application file for complete search history.

(56) References Cited

U.S. PATENT DOCUMENTS

| | | | | |
|---|---|---|---|---|
| 5,509,748 | A * | 4/1996 | Idosako | F16C 11/0638 384/203 |
| 9,091,297 | B2 * | 7/2015 | Morishige | F16C 17/04 |
| 9,618,035 | B2 * | 4/2017 | Morishige | F16C 17/04 |
| 2004/0130115 | A1 | 7/2004 | Kellam et al. | |
| 2004/0240761 | A1 * | 12/2004 | Watai | B60G 11/16 384/420 |
| 2007/0116391 | A1 | 5/2007 | Watai et al. | |
| 2008/0310780 | A1 * | 12/2008 | Watai | B60G 15/068 384/420 |
| 2010/0040317 | A1 * | 2/2010 | Kellam | B60G 15/068 384/482 |
| 2014/0112605 | A1 * | 4/2014 | Morishige | F16C 17/04 384/153 |
| 2014/0185971 | A1 * | 7/2014 | Nagashima | B60G 15/068 384/291 |
| 2014/0355915 | A1 * | 12/2014 | Saito | B60G 15/068 384/368 |
| 2015/0003761 | A1 * | 1/2015 | Nagashima | F16C 33/74 384/297 |
| 2015/0354629 | A1 * | 12/2015 | Sakairi | F16C 17/10 384/420 |
| 2015/0367698 | A1 * | 12/2015 | Stautner | B60G 15/068 384/144 |
| 2015/0375591 | A1 * | 12/2015 | Sakairi | F16C 33/20 384/297 |
| 2015/0377286 | A1 * | 12/2015 | Sakairi | F16C 33/20 384/297 |

FOREIGN PATENT DOCUMENTS

| | | |
|---|---|---|
| CN | 102171465 | 8/2011 |
| FR | 2 966 084 | 4/2012 |
| JP | 2-141722 | 11/1990 |
| JP | 7-279948 | 10/1995 |
| JP | 08-159160 | 6/1996 |
| JP | 10-122233 | 5/1998 |
| JP | 2004-84799 | 3/2004 |
| JP | 2005-3185 | 1/2005 |
| JP | 2006-200672 | 8/2006 |
| JP | 2008-175349 | 7/2008 |
| JP | 2010-223411 | 10/2010 |
| JP | 2012-172814 | 9/2012 |
| WO | WO 2014/030727 | 2/2017 |

OTHER PUBLICATIONS

Machine Translation of JP H08-159160 (Year: 1996).*
International Search Report for PCT/JP2016/061716 dated Jul. 12, 2016, 4 pages.
Search Report issued in CN Appln. No. 201680024045X dated Nov. 7. 2018 (w/ translation).
Search Resort issued in EP Appln. No. 16786295.2 dated Oct. 9, 2018.

* cited by examiner

SLIDING BEARING

This application is the U.S. national phase of International Application No. PCT/JP2016/061716 filed Apr. 11, 2016 which designated the U.S. and claims priority to JP Patent Application No. 2015-092423 filed Apr. 28, 2015, the entire contents of each of which are hereby incorporated by reference.

TECHNICAL FIELD

The present invention relates to a sliding bearing that supports a load of an object to be supported, and in particular relates to a sliding bearing that supports a load applied to a shaft member while allowing rotation of the shaft member.

BACKGROUND ART

A strut-type suspension (McPherson strut) used for a front wheel of an automobile has structure in which a strut assembly comprising a piston rod and a hydraulic shock absorber is combined with a coil spring. When a steering is operated, the strut assembly is rotated together with the coil spring. Accordingly, to allow smooth rotation of the strut assembly, usually a bearing is placed between an upper mount which is a mounting mechanism for mounting the strut assembly onto the automobile body, and an upper spring seat that is a spring seat for the upper end of the coil spring.

For example, the Patent Literature 1 discloses a sliding bearing made of synthetic resin, as a bearing for a strut-type suspension. This sliding bearing comprises: an upper case made of synthetic resin which is installed on the side of an upper mount; a lower case made of synthetic resin which is installed on the side of an upper spring seat and is combined rotatably with the upper case; and an annular center plate made of synthetic resin which is placed in an annular space formed by combining the upper case with the lower case and realizes smooth rotation between the upper case and the lower case.

Here, the center plate is a ring member having an L-shape in cross-section, comprising: a ring portion which has a surface in which a thrust bearing surface is formed; and a cylindrical portion which connects to an inner peripheral edge of the back surface of the ring portion, and has an inner peripheral surface in which a radial bearing surface is formed. Further, the upper case has: an annular thrust load transmission surface which slides on the thrust bearing surface which is formed in the surface of the ring portion of the center plate; and a cylindrically-shaped radial load transmission surface which is inserted into the cylindrical portion of the center plate and slides on the radial bearing surface which is formed in the inner peripheral surface of the cylindrical portion of the center plate.

The sliding bearing having the above structure supports the load in the thrust direction applied to a strut-type suspension by the thrust bearing surface which is formed in the surface of the ring portion of the center plate, via the thrust load transmission surface of the upper case. On the other hand, the sliding bearing supports the load applied to the strut-type suspension in the radial direction by the radial bearing surface which is formed in the inner peripheral surface of the cylindrical portion of the center plate, via the radial load transmission surface of the upper plate.

CITATION LIST

Patent Literature

Patent Literature 1: Japanese Unexamined Patent Application Laid-Open No. 2012-172814

SUMMARY OF INVENTION

Technical Problem

In the sliding bearing described in the Patent Literature 1, dimension tolerance is set for the upper case, the lower case, and the center plate so that these parts can be surely combined. Accordingly, when these parts are combined to make up the sliding bearing, a clearance is generated between the radial load transmission surface of the upper case and the radial bearing surface which is formed in the inner peripheral surface of the cylindrical portion of the center plate. Accordingly, when the sliding bearing is set in a strut-type suspension, backlash in the radial direction may occur in the sliding bearing, causing feeling of discomfort in steering operation.

The present invention has been made considering the above situation, and an object of the invention is to provide a sliding bearing that can prevent backlash in the radial direction.

Solution to Problem

To solve the above problem, the present invention provides a sliding bearing in which a bearing surface of an annular center plate, and a load transmission surface which is formed in an upper case or a lower case for sliding on the bearing surface of the center plate have respective conical surface shapes, so that a load applied to the upper case in the thrust direction and a load applied to the upper case in the radial direction are supported by the same bearing surface via the same load transmission surface.

For example, the present invention provides a sliding bearing for supporting a load of an object to be supported, comprising:

an upper case which receives the load of the object to be supported;

a lower case which is rotatably combined with the upper case and forms an annular space between the lower case and the upper case; and an annular center plate which is placed in the annular space and realizes rotation between the upper case and the lower case, wherein:

the center plate has a bearing surface of a conical surface shape; and the upper case or the lower case has a load transmission surface of a conical surface shape that slides on the bearing surface of the center plate.

Here, the sliding bearing may support the load of the object to be supported, which is applied to a shaft member, while allowing rotation of the shaft member, wherein:

the upper case is mounted on a mounting mechanism for mounting the shaft member on the object to be supported, in a state that the shaft member is inserted in the upper case;

the lower case supports a coil spring that is combined with the shaft member, in a state that the shaft member is inserted in the lower case; and the center plate is placed in the annular space, in a state that the shaft member is inserted in the center plate.

Advantageous Effects of Invention

According to the present invention, the bearing surface of the center plate, and the load transmission surface of the upper case or the lower case have the respective conical surface shapes, so that a load applied to the upper case in the thrust direction and a load applied to the upper case in the radial direction are supported by the same bearing surface via the same load transmission surface. By this reason, clearance is not generated in the radial direction between the bearing surface and the load transmission surface, in a state that the bearing surface and the load transmission surface are in contact with each other to support a load applied to the upper case in the thrust direction and a load applied to the upper case in the radial direction. Accordingly, it is possible to prevent backlash in the radial direction of the sliding bearing.

DESCRIPTION OF EMBODIMENT

In the following, one embodiment of the present invention will be described.

Figure 1:
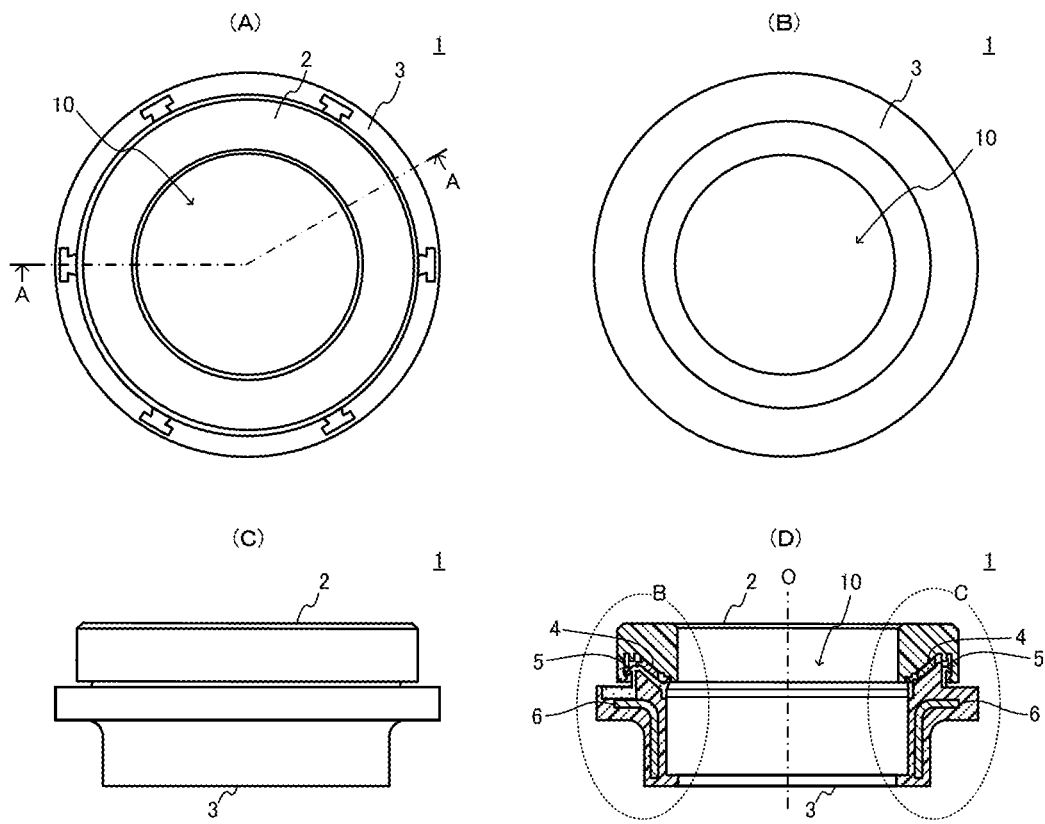
FIGS. 1(A), 1(B), and 1(C) are respectively a front view, a back view, and a side view of a sliding bearing according to one embodiment of the present invention.
FIG. 1(D) is an A-A cross-section view of the sliding bearing 1 shown in FIG. 1(A)
Figure 2:
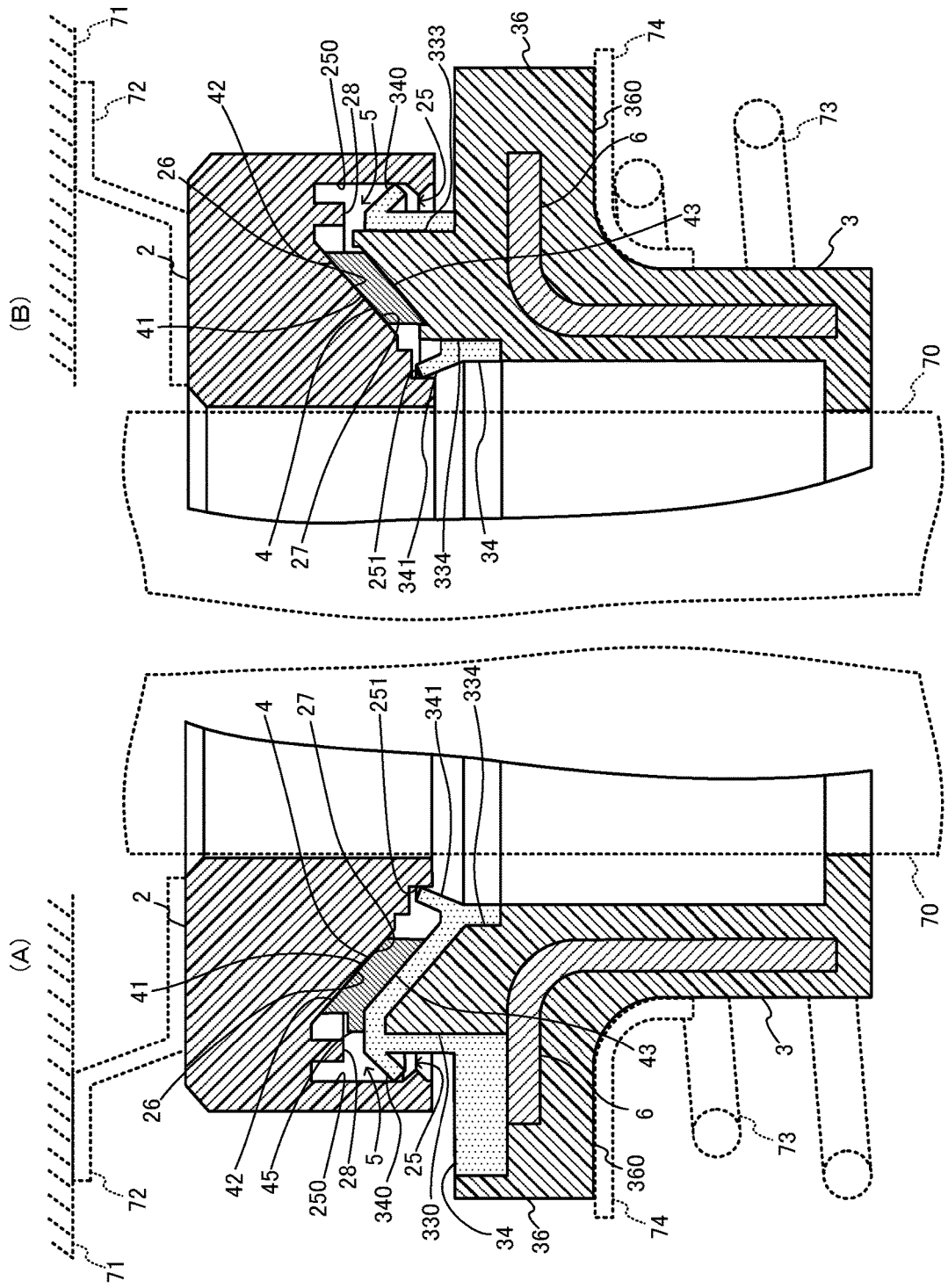
FIG. 2(A) is an enlarged view showing the part B of the sliding bearing 1 shown in FIG. 1(D)
FIG. 2(B) is an enlarged view showing the part C of the sliding bearing 1 shown in FIG. 1(D)

FIGS. 1(A), 1(B), and 1(C) are respectively a front view, a back view, and a side view showing a sliding bearing 1 according to the present embodiment, and FIG. 1(D) is an A-A cross-section view of the sliding bearing 1 shown in FIG. 1(A). Further, FIG. 2(A) is an enlarged view showing the part B of the sliding bearing 1 shown in FIG. 1(A), and FIG. 2(B) is an enlarged view showing the part C of the sliding bearing 1 shown in FIG. 1(D).

The sliding bearing 1 of the present embodiment has a receiving hole 10 for receiving a strut assembly 70 of a strut-type suspension as a shaft member, and supports a load of an automobile 71 as an object to be supported applied to the strut-type suspension, while allowing turning of the strut assembly 70 received in this receiving hole 10. As shown in the figures, the sliding bearing 1 comprises: an upper case 2; a lower case 3 which is rotatably combined with the upper case 2 to form an annular space 5; an annular center plate 4 placed in the annular space; and, although not shown, lubricating grease filled in the annular space 5.

The upper case 2 is formed of thermoplastic resin that is superior in sliding characteristics such as polyacetal resin impregnated if necessary with lubricating oil. This upper case 2 is mounted to an upper mount 72 as a mounting mechanism, in a state that the strut assembly 70 of the strut-type suspension is inserted in the upper case 2.

Figure 3:
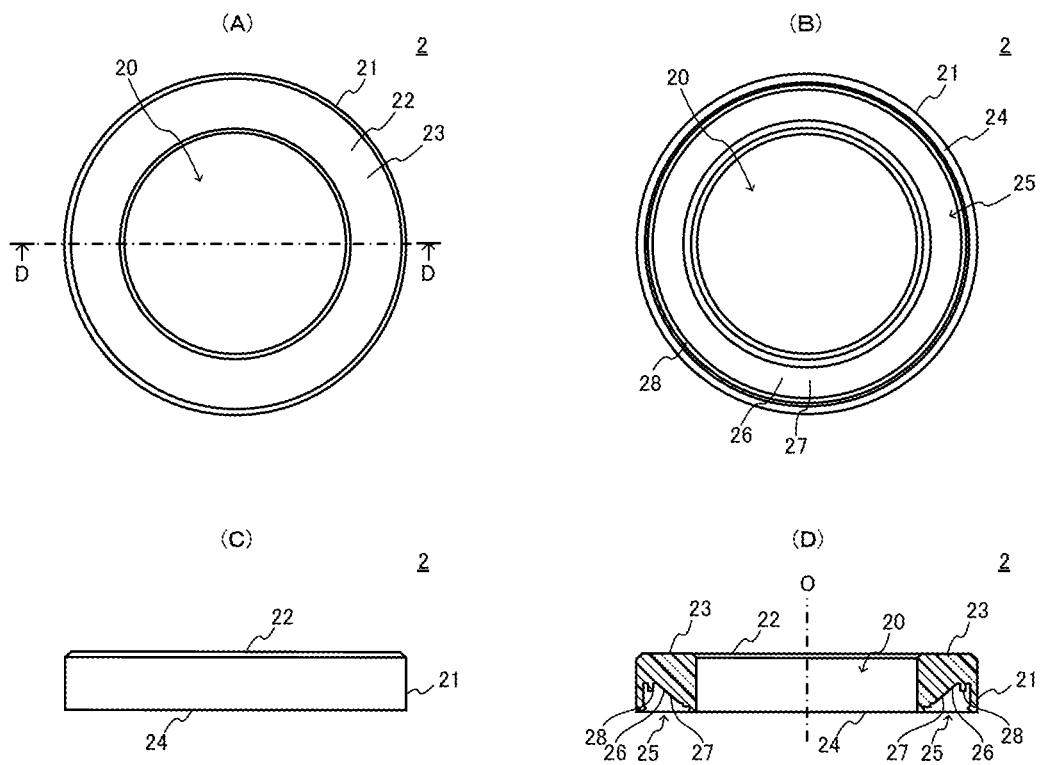
FIGS. 3(A), 3(B), and 3(C) are respectively a front view, a back view, and a side view of an upper case 2.
FIG. 3(D) is a D-D cross-section view of the upper case 2 shown in FIG. 3(A)

FIGS. 3(A), 3(B), and 3(C) are respectively a front view, a back view, and a side view of the upper case 2, and FIG. 3(D) is a D-D cross-section view of the upper case 2 shown in FIG. 3(A).

As shown in the figures, the upper case 2 comprises: an annular upper case body 21 which has an insertion hole 20 for inserting the strut assembly 70; a mounting surface 23 which is formed in the upper surface 22 of the upper case body 21 in order to mount the sliding bearing 1 to the upper mount 72; and an annular groove 25 which is formed in the lower surface 24 of the upper case body 21 so as to be open on the side of the lower surface 23 and closed on the side of the upper surface 22, in order to form an annular space 5 when the upper case 2 is combined rotatably with the lower case 3.

The groove bottom 26 of the annular groove 25 is formed to have a conical surface shape, wherein its bottom is positioned on the side of the upper surface 22 of the upper case body 21, its top is positioned on the side of the lower surface 24, and its center line is positioned at the axis O of the insertion hole 20. In this groove bottom 26, a load transmission surface 27 that slides on the below-described bearing surface 42 of the center plate 4 is formed.

Further, in the groove bottom 26 of the annular groove 25, an annular projection 28 is formed on the side of the outer peripheral edge of the load transmission surface 27, which projects from the groove bottom 26 toward the lower surface 23 of the upper case body 21. This annular projection 28 encloses the center plate 4 placed in the annular groove 25, and prevents the lubricating grease which is provided on the bearing surface 42 of the center plate 4, from being pushed outward in the radial direction from the bearing surface 42 of the center plate 4 when a load is applied to the strut-type suspension.

The lower case 3 is an insert-molded member produced by embedding a steel plate 6 as a reinforcement in a resin-molded body made of thermoplastic resin such as polyamide resin. The lower case 3 supports the upper end of a coil spring 73 of the strut-type suspension, in a state that the strut assembly 70 of the strut-type suspension is inserted in the lower case 3.

Figure 4:
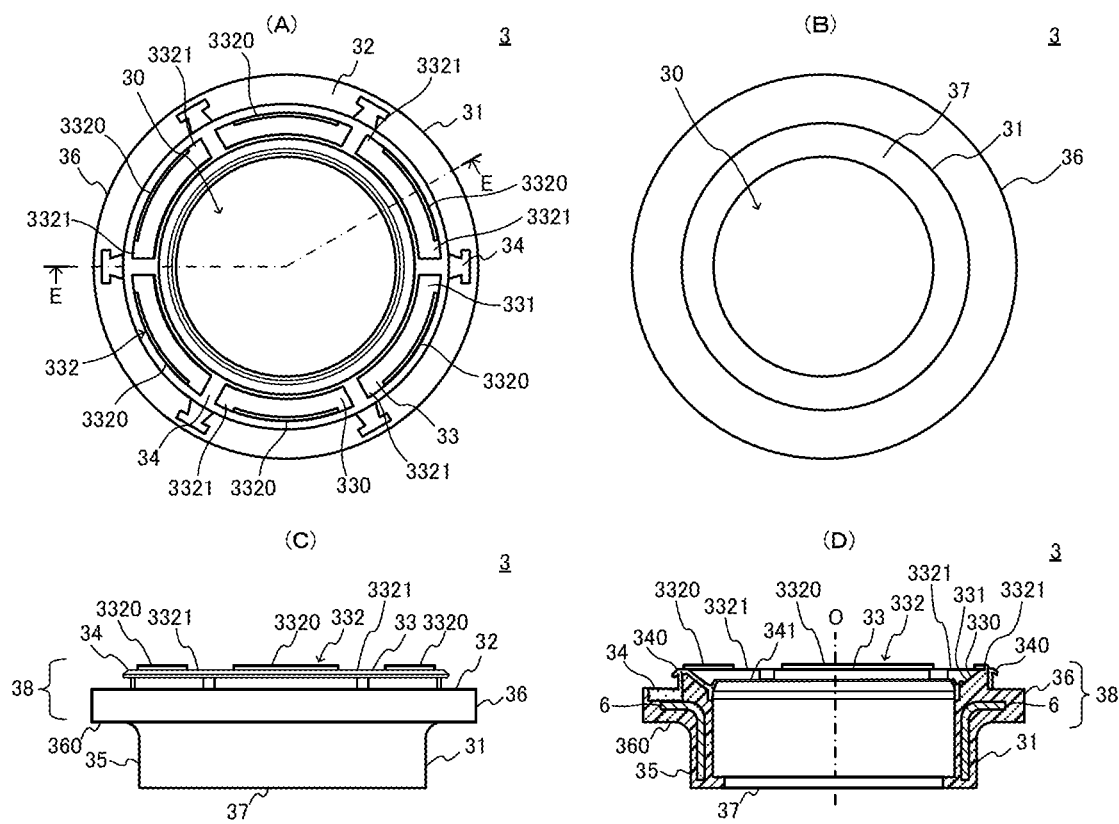
FIGS. 4(A), 4(B), and 4(C) are respectively a front view, a back view, and a side view of a lower case 3.
FIG. 4(D) is an E-E cross-section view of the lower case 3 shown in FIG. 4(A)

FIGS. 4(A), 4(B), and 4(C) are respectively a front view, a back view, and a side view of the lower case 3, and FIG. 4(D) is an E-E cross-section view of the lower case 3 shown in FIG. 4(A).

As shown in the figures, the lower case 3 comprises: a cylindrical lower case body 31 which has an insertion hole 30 for inserting the strut assembly 70; a flange portion 36 which is formed on the side of the upper end 38 of the lower case body 31, and is extended outward in the radial direction from the outer peripheral surface 35 of the lower case body 31; an annular projection 33 which is formed in the upper surface 32 of the flange portion 36 and projects toward the upper case 2, so that the annular projection 33 is inserted in the annular groove 25 formed in the lower surface 23 of the upper case body 21 of the upper case 2 to form the annular space 5, when the lower case 3 is rotatably combined with the upper case 2; and a dust seal 34 which is made of elastic body such as urethane resin and fitted to the projection 33. to form the annular space 5, when the lower case 3 is rotatably combined with the upper case 2; and a dust seal 34 which is made of elastic body such as urethane resin and fitted to the projection 33.

An upper spring seat 74 as a spring seat at the upper end of the coil spring 73 of the strut-type suspension is mounted to the lower surface 360 of the flange portion 36, in a state that the strut assembly 70 of the strut-type suspension is inserted.

In the upper surface 330 of the annular projection 33, a mounting surface 331 for mounting the center plate 4 is formed. In the present embodiment, the mounting surface 331 is formed to have a conical surface shape, wherein: its bottom is positioned on the side of the upper end 38 of the lower case body 31; its top is positioned on the side of the lower surface 37; and its center line is positioned at the axis O of the insertion hole 30. However, it is sufficient that the mounting surface 331 is formed to have a shape that is adapted to the shape of the center plate 4 so that the center plate 4 can be mounted.

On the outer periphery side of the mounting surface 331, a rotation lock 332 is formed in a ring shape for preventing rotation of the center plate 4 mounted on the mounting surface 331. The rotation lock is constructed by alternately arranging flat sections 3321 and projecting sections 3320 projecting from the flat sections 3321 toward the upper case 2.

The dust seal 34 is for preventing entry of foreign matters such as dust into the annular space 5 and has lips 340 and 341. As shown in FIGS. 2(A) and 2(B), when the projection 33 of the lower case 3 is inserted into the annular groove 25 formed in the lower surface 24 of the upper case body 21 of the upper case 2, the lip 340 closes a gap between the outer peripheral surface 333 of the projection 33 and an outer-periphery-side inner wall 250 of the annular groove 25, and the lip 341 closes a gap between the inner peripheral surface 334 of the projection 33 and an inner-periphery-side inner wall 251 of the annular groove 25.

The center plate 4 is formed of thermoplastic resin that is superior in sliding characteristics such as polyolefin resin impregnated if necessary with lubricating oil. Further, the center plate 4 is fixed on the mounting surface 331 of the annular projection 33 formed in the upper surface 32 of the flange portion 36 of the lower case 3, and slides on the load transmission surface 27 of the annular groove 25 formed in the lower surface 24 of the upper case body 21 of the upper case 2. As a result, the center plate 4 functions as a bearing body that realizes free rotation between the upper case 2 and the lower case 3.

Figure 5:
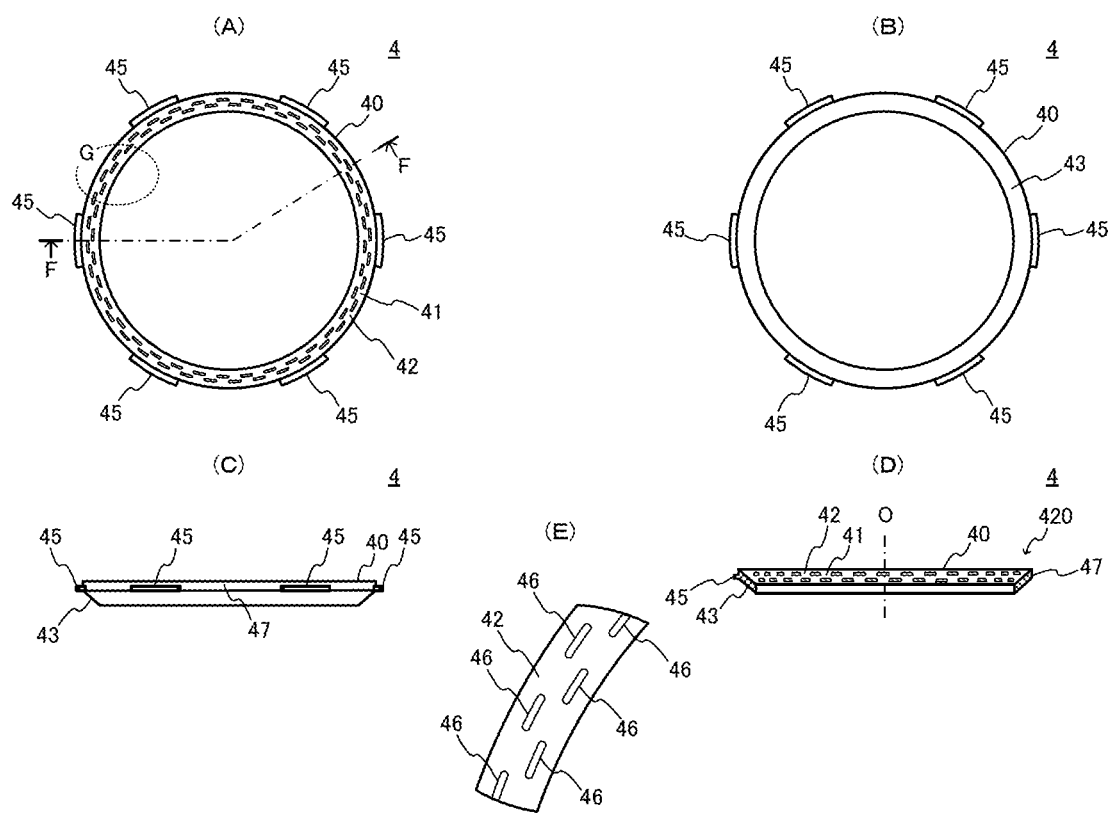
FIGS. 5(A), 5(B), and 5(C) are respectively a front view, a back view, and a side view of a center plate 4.
FIG. 5(D) is an F-F cross-section view of the center plate 4 shown in FIG. 5(A)
FIG. 5(E) is an enlarged view showing the part G of the center plate 4 shown in FIG. 5(A)

FIGS. 5(A), 5(B), and 5(C) are respectively a front view, a back view, and a side view of the center plate 4, FIG. 5(D) is an F-F cross-section view of the center plate shown in FIG. 5(A), and FIG. 5(E) is an enlarged view showing the part G of the center plate 4 shown in FIG. 5(A).

As shown in the figures, the center plate 4 comprises: an annular center plate body 40 into which the conical-surface-shaped groove bottom 26 of the annular groove 25 of the upper case 2 is inserted; and a plurality of projecting rotation locks 45 extending outward in the radial direction from the side surface 47 of the center plate body 40.

The upper surface 41 of the center plate body 40 is formed to have a conical surface shape, wherein: its bottom is positioned on the side of the upper case 2; its top is positioned on the side of the lower case 3; and its center line is positioned at the axis O. In this upper surface 41, the bearing surface 42 which slides on the load transmission surface 27 formed in the groove bottom 26 of the annular groove 25 of the upper case 2 is formed. On the side of the inner diameter of the center plate body 40, a burr may be provided.

The rotation locks 45 prevent relative rotation of the center plate 4 to the lower case 3, since each rotation lock 45 is engaged with the projecting sections 3320 positioned on both sides of the corresponding flat section 3321, when the center plate 4 is mounted on the lower case 3 in such a way that the lower surface 43 of the center plate body 40 comes in contact with the mounting surface 331 of the annular projection 33 formed in the upper surface 32 of the lower case body 31 and the rotation locks 45 are positioned on the respective flat sections 3321 of the rotation lock 332 formed on the side of the outer periphery of the mounting surface 331.

In the bearing surface 42, many recessed portions 46 that function as lubricating grease reservoirs are formed. By this, there can be more grease between the bearing surface 42 of the center plate body 40 of the center plate 4 and the load transmission surface 27 formed in the groove bottom 26 of the annular groove 25 of the upper case 2, and thus it is possible to improve the sliding characteristics between the bearing surface 42 and the load transmission surface 27.

In the sliding bearing 1 of the above structure, the center plate 4 is fixed on the mounting surface 331 of the annular projection 33 formed in the upper surface 32 of the flange portion 36 of the lower case 3, and the bearing surface 42 of the center plate 4 slides on the load transmission surface 27 formed in the groove bottom 26 of the annular groove 25 of the upper case 2. By this, the upper case 2 and the lower case 3 are rotatably combined with each other via the center plate 4. Further, the bearing surface 42 of the center plate 4 and the load transmission surface 27 of the upper case 2 are each formed to have a conical surface shape, and therefore the bearing surface 42 and the load transmission surface 27 are positioned obliquely to the thrust direction (the direction of the axis O of the sliding bearing 1 shown in FIG. 1(D)) and to the radial direction of the strut-type suspension. Accordingly, the sliding bearing 1 can support the loads applied to the strut-type suspension in the thrust direction and the radial direction by the same bearing surface 42 via the same load transmission surface 7, while allowing rotation of the strut assembly 70 of the strut-type suspension inserted in the receiving hole 10.

In the present embodiment, further, the bearing surface 42 of the center plate 4, and the load transmission surface 27 of the upper case 2 have each a conical surface shape. By this, clearance is not generated in the radial direction between the bearing surface 42 and the load transmission surface 27, in a state that the bearing surface 42 and the load transmission surface 27 are in contact with each other. Accordingly, it is possible to prevent backlash in the radial direction of the sliding bearing 1

Here, favorable inclination angle (angle formed with a plane perpendicular to the axis O) of the bearing surface 42 and the load transmission surface 27 is 5-20 degrees, and more favorably 10-15 degrees. When the inclination angle of the bearing surface 42 and the load transmission surface 27 is less than 5 degrees, backlash between these surfaces 42 and 27 becomes larger. On the other hand, when the inclination angle is larger than 20 degrees, the sliding force between these two surfaces 42 and 27 becomes larger.

In the present embodiment, a plurality of recessed portions 46 functioning as lubricating grease reservoirs are provided in the bearing surface 42 of the center plate 4, and thus it is possible to hold more lubricating grease on the bearing surface 42. Accordingly, it is possible to support a load applied in the thrust direction of the strut-type suspension, while allowing smooth rotation of the strut assembly 70 of the strut-type suspension for longer periods.

Further, in the thrust sliding bearing 1 of the present embodiment, the annular projection 28 projecting from the groove bottom 26 toward the lower case 3 is provided to enclose the outer periphery side of the center plate 4 placed in the annular space 5 formed by combining the upper case 2 and the lower case 3. This projection 28 can prevent the lubricating grease filled in the annular space 5 from being pushed out from the bearing surface 42 of the center plate 4 outward in the radial direction when a load is applied to the strut-type suspension. Accordingly, it is possible to cover the bearing surface 42 with the lubricating grease film certainly and to support a load applied in the thrust direction of the strut-type suspension while allowing smooth rotation of the strut assembly of the strut-type suspension for longer periods.

The present invention is not limited to the above embodiment, and can be varied variously within the scope of the invention.

For example, in the above embodiment, the center plate 4 is placed and fixed on the lower case 3. However, the center plate 4 may be placed rotatably to the lower case 3. Specifically, a bearing surface may be formed also in the lower surface 43 of the center plate 4 as well as in the upper surface 41 of the center plate 4, so that the bearing surface formed in the lower surface 43 of the center plate 4 contacts slidably with the mounting surface 331 of the projection 33 formed in the upper surface 32 of the lower case body 31 of the lower case 3. In this case, a plurality of recessed portions functioning as lubricating grease reservoirs may be formed also in the bearing surface formed in the lower surface 43 of the center plate 4 as well as in the upper surface 41 of the center plate 4.

Further, in the above embodiment, the bearing surface 42 and the load transmission surface 27 formed in respective conical surface shapes are linear (See FIGS. 2(A) and 2(B)) in cross-sections (the shape of the bearing surface 42 in the cross-section in the direction of the axis O of the center plate 4, and the shape of the load transmission surface 27 in the cross-section in the direction of the axis O of the upper case 2). The present invention, however, is not limited to this. For example, the inclination angle of the bearing surface 42 and the load transmission surface 27 may be changed so that the cross-section shapes of these surfaces become a polygonal line as a combination of two or more straight lines. Or, the cross-section shapes of the bearing surface 42 and the load transmission surface 27 may be circular arcs having different radiuses from each other.

Figure 6:
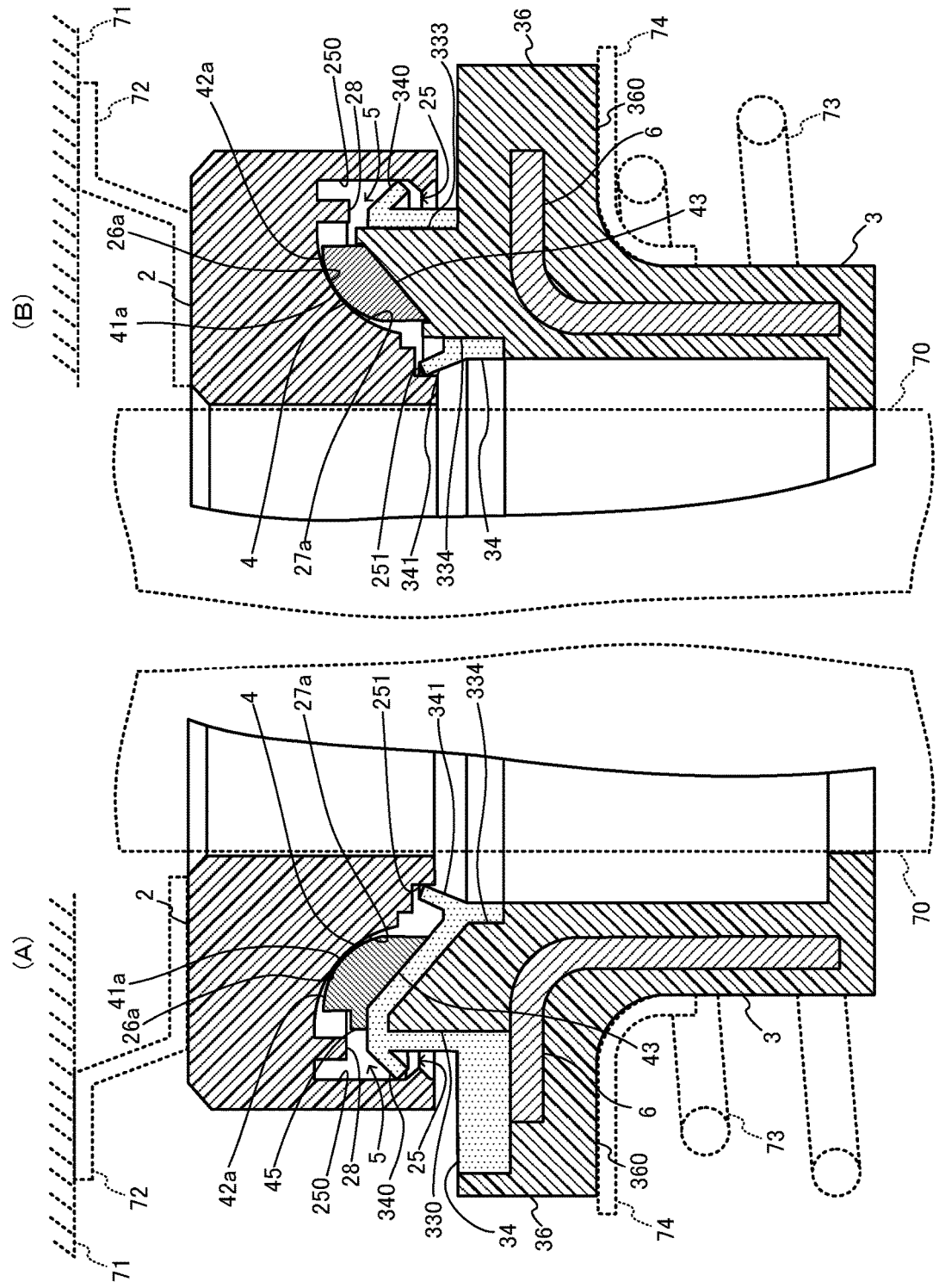
FIGS. 6(A) and 6(B) are views for explaining a variation of the sliding bearing 1, and correspond respectively to FIGS. 2(A) and 2(B).

FIGS. 6(A) and 6(B) are views for explaining a variation of the sliding bearing 1, and correspond respectively to FIGS. 2(A) and 2(B).

As shown in the figures, a load transmission surface 27a is formed in a groove bottom 26a having a conical surface shape of an annular groove 25 provided in the lower surface 24 of an upper case body 21 of an upper case 2, and is circular arc which is recessed toward the upper surface 22 of the upper case body 21 in cross-section. Further, a bearing surface 42a is formed in the upper surface 41a of a center plate 4 having a conical surface shape in such a way that the cross-section of the bearing surface 42a is an circular arc having a smaller radius than that of the load transmission surface 27a and projecting toward the upper case 2.

In the above embodiment, the bearing surface 42 and the load transmission surface 27, each formed to have conical surface shape, are linear in cross-section, and thus come in surface contact with each other when the inclinations of these surfaces 42 and 27 coincide. However, because of production problems and the like, it is difficult to make the bearing surface 42 and the load transmission surface 27 so as to have the same inclination. Thus in fact, the bearing surface 42 and the load transmission surface 27 do not coincide with each other in inclination. Therefore, the bearing surface 42 and the load transmission surface 27 contact each other by line contact. In this case, variation of the inclinations of these surfaces 42 and 27 causes variation in the line contact position of these surfaces 42 and 27. Accordingly, there is a possibility that the sliding characteristics of the sliding bearing 1 are unstable. In contrast with this, in the variation shown in FIGS. 6(A) and 6(B), the bearing surface 42a and the load transmission surface 27a, each formed to have conical surface shape, are the circular arcs having different radiuses (radius of the bearing surface 42a<radius of the load transmission surface 27a) in cross-section. Accordingly, the bearing surface 42a and the load transmission surface 27a contact each other by line contact, at a position where their tangent lines in cross-section coincide. Therefore, it is possible to reduce variation of the position of the line contact between the bearing surface 42a and the load transmission surface 27a and to realize more stable sliding characteristics of the sliding bearing 1.

Further, in the above embodiment, the bearing surface 42 of the center plate 4, and the load transmission surface 27 of the upper case 2, are each formed to have the conical surface shape, wherein: its center line is at the axis O; its bottom is on the side of the upper case 2; and its top is on the side of the lower case 3. The present invention, however, is not limited to this. The bearing surface 42 of the center plate 4, and the load transmission surface 27 of the upper case 2, may be each formed to have a conical surface shape, wherein: its bottom is positioned on the side of the lower case 3; its top is positioned on the side of the upper case 2; and its center line is positioned at the axis O.

Further, in the above embodiment, the mounting surface 23 formed in the upper surface 22 of the upper case body 21 of the upper case 2 is made to be perpendicular to the strut axis of the strut-type suspension. The present invention, however, is not limited to this. The angle of the mounting surface 23 of the upper case 2 to the strut axis of the strut-type suspension can be suitably determined depending on the performance required for the vehicle. For example, the mounting surface 23 of the upper case may be inclined to the strut axis of the strut-type suspension.

Further, in the above embodiment, the lower surface 360 of the flange portion 36 of the lower case 3 is provided with the upper spring seat that supports the upper end of the coil spring 73 of the strut-type suspension. However, the lower surface 360 of the flange portion 36 of the lower case 3 may function by itself as an upper spring seat.

INDUSTRIAL APPLICABILITY

The present invention can be widely applied to a sliding bearing that supports a load of an object to be supported. In particular, the present invention can be applied to a sliding bearing that supports a load applied to a shaft member, while allowing rotation of the shaft member.

REFERENCE SIGNS LIST

1: sliding bearing; 2: upper case; 3: lower case; 4: center plate; 5: annular space; 6: steel plate; 10: receiving hole of the sliding bearing 1; 20: insertion hole of the upper case 2; 21: upper case body; 22: upper surface of the upper case body; 23: mounting surface of the upper case body 21; 24: lower surface of the upper case body 21; 25: annular groove of the upper case body 21; 26, 26*a*: groove bottom of the annular groove 25; 27, 27*a*: load transmission surface; 28: annular projection of the annular groove 25; 30: insertion hole of the lower case 3; 31: lower case body; 32: upper surface of the lower case body 31; 33: annular projection of the lower case body 31; 34: dust seal; 35: outer peripheral surface of the lower case body 31; 36: flange of the lower case body 31; 37: lower surface of the lower case body 31; 38: upper end of the lower case body 31; 40: center plate body; 41, 41*a*: upper surface of the center plate body 40; 42, 42*a*: bearing surface; 43: lower surface of the center plate body 40; 45: rotation lock of the center plate body 40; 46: recessed portion of the bearing surface; 47: side surface of the center plate body 40; 250: outer-periphery-side inner wall of the annular groove 25; 251: inner-periphery-side inner wall of the annular groove 25; 330: upper surface of the annular projection 33; 331: mounting surface of the lower case body 31; 332: rotation lock of the lower case body 31; 333: outer peripheral surface of the annular projection 33; 334: inner peripheral surface of the annular projection 33; 340, 341: lip of the dust seal 34; 360: lower surface of the flange 36; 3320: projecting section of the rotation lock 332; and 3321: flat section of the rotation lock 332.

The invention claimed is:

1. A sliding bearing for supporting a load of an object to be supported, comprising:
   an upper case which receives the load of the object to be supported;
   a lower case which is rotatably combined with the upper case and forms an annular space between the lower case and the upper case; and
   an annular center plate which is placed in the annular space and realizes rotation between the upper case and the lower case, wherein:
   the center plate has a bearing surface whose shape in cross-section in an axial direction is a circular arc in which an outer end of the center plate is located axially closer to an upper case side than an inner end of the center plate, and a lower surface of a conical surface shape whose shape in cross-section in the axial direction is linear,
   the upper case has a load transmission surface which slides on the bearing surface of the center plate and whose shape in cross-section in the axial direction is a circular arc in which an inner end of the upper case is axially located closer to a lower case side than an outer end of the upper case,
   the lower case has a mounting surface of a conical surface shape which comes in contact with the lower surface of the center plate to fix the center plate on the lower case and whose shape in cross-section in the axial direction is linear, and
   the circular arc of the bearing surface in cross-section in the axial direction of the center plate and the circular arc of the load transmission surface in the axial direction of the upper case have different radiuses from each other.

2. A sliding bearing of claim 1, wherein:
   the sliding bearing supports the load of the object to be supported, while allowing rotation of a shaft member to which the load is applied;
   the upper case is mounted on a mounting mechanism for mounting the shaft member on the object to be supported, in a state that the shaft member is inserted in the upper case;
   the lower case supports a coil spring that is combined with the shaft member, in a state that the shaft member is inserted in the lower case; and
   the center plate is placed in the annular space, in a state that the shaft member is inserted in the center plate.

\* \* \* \* \*